United States Patent Office 3,702,317
Patented Nov. 7, 1972

3,702,317
METHOD OF MAKING ARYLENE MODIFIED SILOXAZANES INCORPORATING CYCLODISILAZANE STRUCTURES
Laurence W. Breed, Overland Park, Kans., Richard L. Elliott, Kansas City, Mo., and Harold Rosenberg, Dayton, Ohio, assignors to the United States of America as represented by the Secretary of the Air Force
No Drawing. Filed Nov. 18, 1970, Ser. No. 90,836
Int. Cl. C08f 11/04
U.S. Cl. 260—46.5 P           17 Claims

ABSTRACT OF THE DISCLOSURE

A polymer composition of arylene modified siloxazanes incorporating cyclodisilazane structures is prepared by the condensation of arylenedisilanols and cyclodisilazane derivatives. The reaction is preferably carried out in a suitable solvent at sufficiently high dilution to make possible the formation of high molecular weight polymers. Gelling of the product polymer is prevented by treating the initial solution of reactants, after partial polymerization has been achieved, with a silylating agent capable of converting residual silanol groups of the disilanol to siloxane groups. Further polymerization to achieve still higher molecular weights is then possible and the products are stable for relatively long periods of time without gelling. Finally, the product polymers which exhibit good elastomeric properties as well as thermal stability can be compounded into rubbers by cross-linking the product polymer through use of a peroxide catalyst and preferably with the addition of a suitable filler.

This invention relates to the production of silicon-nitrogen polymers having superior elastomeric properties as well as improved hydrolytic and thermal stability, which polymers can be compounded into rubbers characterized by the same properties.

Polymers containing arylene groups, together with the —Si—O—Si linkage characteristic of silicones have previously been found to be useful in the aerospace field as elastomers because of their high temperature stability and other desirable properties. It has not, however, been possible heretofore to compound a useful elastomer containing an arylene group, the —Si—O—Si— group and a cyclodisilazane group in the elemental polymer repeating unit. It has been found that a polymer containing the above-mentioned three groups exhibits the previously described desirable properties, and in addition shows superior elastomeric properties when prepared according to the teachings of the instant invention.

It is, therefore, an object of the present invention to provide a silicon-containing polymer which exhibits elastomeric properties and is thermally and hydrolytically stable to a relatively high degree as a result of the incorporation of a cyclodisilazane structural group in the elemental polymer repeating unit.

Another object of the invention is to prepare a silicon-containing polymer characterized by the presence of a cyclodisilazane group by the condensation of a cyclodisilazane derivative with an arylene disilanol.

An important aim of this invention is also to provide a method of modifying polymers of the type described in the foregoing objects to yield a product polymer which is not cross-linked and can be further polymerized to obtain higher molecular weight, soluble products.

A further object of the invention is to provide a method of modifying polymer condensates of the type described in the above objects to prevent the product polymers from gelling during storage for relatively long periods of time.

It is also an object of this invention to provide a polymer of the type described in the foregoing objects which can be compounded into a rubber using conventional catalysts.

The polymers of the present invention are characterized by an elemental repeating unit of the formula:

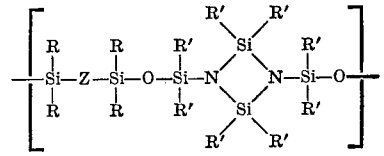

and are prepared by condensing an arylenedisilanol with a N,N'-aminosilyl derivative of a cyclodisilazane according to the following reaction:

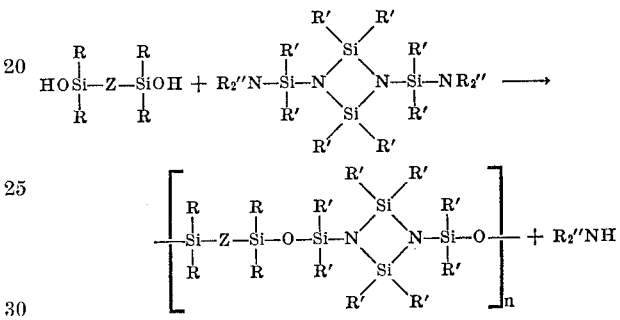

In the above formulas, R, R', and R'' each represents a member selected from the group consisting of $C_1$ to $C_3$ alkyl radicals and aromatic radicals having six carbon atoms in the aromatic ring. Also, in each of the above formulas Z represents an arylene group and $n$ is a relatively large number.

The arylene group represented by Z in the above formulas can be a single phenylene structure such as m-phenylene or p-phenylene; a diphenylene group; or a group consisting of two phenylene groups linked by one or more heteroatoms, e.g. phenyleneoxyphenylene ($C_6H_4OC_6H_4$). In addition, the arylene group includes structures where the arylene ring is substituted by other groups such as $CH_3$, $C_2H_5$, F, Cl, or Br. In the preferred embodiment of the invention Z is a phenylene-oxyphenylene group.

The hydrocarbon groups represented by R, R', and R'' may be alike or different and include alkyl radicals such as methyl, ethyl and propyl; aryl radicals such as phenyl; and cycloalkyl radicals such as cyclohexyl. In addition, the hydrocarbon radicals represented by R, R', and R'' may be substituted with such atoms as F, Cl, and Br, and such groups as methyl, ethyl, and propyl. Of the substituted groups 3,3,3-trifluoropropyl has been found to be particularly desirable although the preferred embodiment of the invention is represented by R, R', and R'', each being an unsubstituted methyl group.

Disilanols of the general formula referred to above can be prepared by the hydrolysis of a suitable starting material, for example, p-phenylenebis(ethoxydimethylsilane) in the manner described by L. W. Breed and R. L. Elliott in the Journal of Organometallic Chemistry, 9, 188 (1967) or by other suitable known procedure. Aminosilylcyclodisilazanes of the general formula set forth above and which are utilized as reactants in the present invention are prepared by the aminolysis of a suitable starting material, for example, by the treatment of N,N'-bis(chlorodimethylsilyl) tetramethylcyclodisilazane with dimethylamine in the manner disclosed by L. W. Breed et al. in the Journal of Organometallic Chemistry 24,315 (1970) or by other known procedures.

The polymers of the present invention can be prepared by the direct condensation of the cyclodisilazane and arylenedisilanol monomers. Exact stoichiometric quantities of the reactants are preferred, although an excess of either monomer can be employed. The monomer mixtures can be heated at temperatures from 20° C. to 200° C. to effect polymerization. The polymerization reaction is preferably continued until the secondary amine of the formula $R''_2NH$ which is formed as a by-product of the polymerization is completely volatilized from the reaction mixture. The following example is representative of this procedure.

EXAMPLE I

A mixture of 1.7445 g. (0.005001 mole) of N,N'-bis - [(dimethylamino)dimethylsilyl]tetramethylcyclodisilazane and 1.5928 g. (0.005001 mole) of bis(p-dimethylhydroxysilylphenol) ether was heated for two hours at 40° C. The product was a soft gum which was insoluble in toluene, indicating a cross-linked polymer. When heating was continued at 160° C. for 18 hours a hard rubbery material was obtained which was also toluene-insoluble.

It has been found, however, that by carrying out the polymerization reaction at a relatively high dilution in a suitable organic solvent, the degree of polymerization may be enhanced to obtain higher molecular weight polymers. This is desirable since the elastomeric properties of the product polymer are normally enhanced with an increase in molecular weight. In general, a concentration of 2.5 millimoles per milliliter or less for each of the monomer reactants is desirable to avoid cross-linking during advancement of the polymerization reaction. Suitable solvents include benzene, toluene, xylene, hexane, petroleum ether, ethylene glycol dimethyl ether, diethylene glycol dimethyl ether and the like. The high molecular weight polymers are obtained by advancing the polymerization with heat after removal of the solvent preferably at temperatures below 150° C. The following examples are illustrative of the procedures utilizing high and low dilution ratios and also illustrate how the relative quantities of reactants can be varied.

EXAMPLE II

A mixture of 0.7962 g. (0.00250 mole) of bis(p-hyhydroxydimethylsilylphenyl) ether and 0.8720 g. (0.00250 mole) of N,N' - bis[(dimethylamino)dimethylsilyl]tetramethylcyclodisilazane was dissolved in 5 ml. of toluene and refluxed for 7.5 hours. After removal of the toluene at reduced pressure, gelling of the product polymer was noted after 0.66 hour, indicating cross-linking.

When the foregoing example was repeated using 10 ml. of toluene to double the dilution ratio, no immediate gelling of the product polymer was observed, and an inherent viscosity of 0.15 dl./g. (0.5% in toluene at 30° C.) for the product polymer was determined using standard procedures (in this and all subsequent examples a 0.5 wt. percent toluene solution at 30° C. was utilized.)

Upon doubling the dilution ratio a second time through the use of 20 ml. of toluene, no significant change in the results obtained with 10 ml. of solvent was observed. The inherent viscosity of the product polymer was 0.13 dl./g.

EXAMPLE III

A mixture of 19.1 g. (0.055 mole) of N,N'-bis[(dimethylamino) dimethylsilyl] tetramethylcyclodisilazane and 15.9 g. (0.050 mole) of bis(p-dimethylhydroxysilylphenyl) ether was dissolved in 100 ml. of toluene and stirred at room temperature for one hour. The toluene was removed under reduced pressure and the residual polymer was gradually heated to 75° C. The toluene-soluble product polymer was found to have an inherent viscosity of 0.21 dl./g. (0.5% in toluene at 30° C.).

The foregoing example was repeated using mole ratios of reactants of 1:1, 1:1.05, and 1:1.1 with similar results being observed.

While the product polymers in both Examples II and III above, where high dilution ratios were utilized, were found to be toluene-soluble, thus indicating no cross-linking had occurred, after several days storage at room temperature, the products were no longer completely soluble in toluene indicating some cross-linking had taken place.

It has been found that by modifying the product polymers obtained at high dilution, cross-linking of the same can be avoided, thus allowing the same to be stored for relatively long periods of time without gelling. In addition, by first modifying the polymer and then advancing the polymerization with heat, the molecular weight of the polymer may be increased beyond the molecular weights otherwise attainable. Apparently, the undesirable side reactions that lead to the cross-linking of the polymers are attributable to the presence of residual silanol groups of the disilanol. It is thought that under certain conditions the silanol groups condense with the cyclodisilazane structure in the polymer to form a cross-linked product. By interrupting the heating steps after partial polymerization of the disilanol and cyclodisilazane is completed, and treating the reaction mixture with a silylating agent capable of converting silanol groups to siloxane groups, cross-linking of the product polymer upon storage or further heating is prevented. Typical silylating agents include bis(trimethylsilyl)acetamide and hexamethyldisilazane. The step of reacting the silylating agent with the residual silanol groups is preferably carried out in a solvent of the same type as used in the initial polymerization. The concentration of the silylating agent is variable over a wide range, depending upon the nature of the monomers and the particular properties desired for the product polymer. A typical concentration of silylating agent is 20 ml. of a 0.01 g./ml. solution of bis(trimethylsilyl)acetamide in toluene for a polymer prepared from 0.02 mole of each of the monomers. It is preferable to first remove the solvent utilized in the initial condensation polymerization reaction, e.g., according to the procedure of Example III above, before the silylating agent is added to the polymer. The silylating agent is then added after which the polymerization can be advanced by further heating of the product. Again, before final curing of the polymer it is desirable to remove the silylating agent solvent to permit the temperature to be raised to a higher level, within the range of 100° C. to 200° C., than would otherwise be possible. In some instances it is not necessary to advance the initial polymerization by removal of the solvent and heating prior to addition of the silylating agent, in which case the latter may be added directly to the combined solutions of the initial reactants and the procedure outlined above subsequently followed. Similarly, the steps of removing the solvent subsequent to addition of the silylating agent and then heating the polymer may be omitted. The following examples are illustrative of the above procedure for advancing the polymerization of the polymer and modifying the same to prevent cross-linking upon heating or storage.

EXAMPLE IV

Equimolar quantities of N,N'-bis[(dimethylamino)-dimethylsilyl]tetramethylcyclodisilazane and bis(p-hydroxydimethylsilylphenyl) ether (0.002500 mole of each) were dissolved in 10 ml. of toluene. The solution was heated on a steam bath for 2 hours, cooled, treated with 2.5 ml. of a 0.010 g./ml. solution of bis(trimethylsilyl)acetamide in toluene and heated an additional 2 hours. The solvent was then evaporated in a rotary evaporator and the residue was heated at 150° C. for 2 hours in a Wood's metal bath. The product polymer was purified by dissolving the same in 20 ml. of petroleum ether, (B.P. 60–90° C.) and then washing with 50 ml. of water. The petroleum ether solution was then dried over sodium sulfate and the remaining solvent evaporated under reduced pressure to yield a product polymer with an inherent viscosity of 0.30 dl./g. When this polymer was heated at 150° C. for 4 hours, the inherent viscosity increased to 0.33 dl./g., but additional heating did not change the viscosity. The following is an analysis of the elementary content of the polymer:

Calcd. for $C_{24}H_{44}N_2O_3Si_6$ (percent): C, 49.94; H, 7.68; N, 4.85; Si, 29.20. Found (percent): C, 49.83, H, 7.76; N, 4.69; Si, 29.21.

EXAMPLE V

A mixture of 0.00500 mole of bis(p-hydroxydimethylsilylphenyl) ether and 0.00500 mole of N,N'-bis[(dimethylamino)dimethylsilyl]tetramethylcyclodisilazane and 20 ml. of toluene was mixed at room temperature until the monomers dissolved and then heated for 4 hours at 60° C. after which the solvent was evaporated. A portion of the product polymer (1.5 g.) was dissolved in 10 ml. of toluene containing 0.010 g./ml. of bis(trimethylsilyl) acetamide. Another portion of the product polymer (1.9 g.) was dissolved in 10 ml. of toluene without the addition of the acetamide. After both of the polymer solutions were refluxed 2 hours, the solvent was evaporated under reduced pressure and the polymers then heated for an additional 2 hours at 150° C. in a Wood's metal bath. The untreated polymer gelled within one hour and could not be dissolved in toluene. The polymer to which the acetamide had been added remained toluene soluble after 29 days storage.

EXAMPLE VI

A solution of 8.0984 g. (0.0200 mole) of N,N'-bis[(diethylamino)dimethylsilyl]tetramethylcyclodisilazane and 6.3696 g. (0.0200 mole) of bis(p-hydroxydimethylsilylphenyl)ether in 80 ml. of toluene was stirred for 2 hours at room temperature and then heated 2 hours on a steam bath. The solvent was evaporated and the product polymer was heated for 2 hours at 100° C. under vacuum in a Wood's metal bath after which it was cooled and dissolved in 64 ml. of toluene and 20 ml. of a 0.010 g./ml. toluene solution of bis(trimethylsilyl)acetamide. The toluene solution of polymer and acetamide was then heated on a steam bath for 2 hours, after which the solvent was removed under reduced pressure. The polymer residue was purified in the manner set forth in Example IV and the product polymer was heated at 150° C. for 15 minutes under reduced pressure. The inherent viscosity of the polymer was 0.64 dl./g. The polymer remained toluene soluble after 11 days storage. The polymerization yield was 97%. The following is an analysis of the elemental content of the product polymer:

Calcd. for $C_{24}H_{44}N_2O_3Si_6$ (percent): C, 49.99; H, 7.69; N, 4.86; Si, 29.14. Found (percent): C, 50.29; H, 7.63; N, 4.88; Si, 29.75.

EXAMPLE VII

Equimolar quantities (0.002500 mole) of N,N'-bis[(diethylamino)dimethylsilyl]tetramethylcyclodisilazane and p-phenylenebis(dimethylsilanol) were polymerized according to the procedure set forth in Example VI, except that the final heating of the polymer was carried out at 200° C. for 15 minutes. The product had an inherent viscosity of 0.38 dl./g.

EXAMPLE VIII

When 1.0123 g. (0.002500 mole) of N,N'-bis[(dimethylamino)dimethylsilyl]tetramethylcyclodisilazane and 0.5660 g. (0.002500 mole) of p-phenylenebis(dimethylsilanol) were polymerized according to the procedure of Example VI except that the 100° and 150° heating steps in the referenced example were omitted, a polymer with an inherent viscosity of 0.17 dl./g. was obtained.

EXAMPLE IX

A condensation polymerization was carried out using 0.002501 mole of N,N'-bis[(diethylamino)dimethylsilyl] tetramethylcyclodisilazane and an equimolar quantity of p-phenylenebis(methylphenylsilanol) according to the procedure set forth in Example VI. After purification in the manner described, the product polymer was found to have an inherent viscosity of 0.21 dl./g.

EXAMPLE X

When the condensation reaction of Example IX was repeated using an equimolar quantity of m-phenylenebis-(methylphenylsilanol) the product polymer was found to have an inherent viscosity of 0.26 dl./g.

EXAMPLE XI

The procedure of Example IX was repeated again using the same cyclodisilazane and an equimolar quantity of m-phenylenebis(dimethylsilanol). The product polymer had an inherent viscosity of 0.30 dl./g. after purification.

As previously mentioned, the product polymers of the present invention have been found to exhibit superior thermal and hydrolytic stability in addition to their elastomeric properties. The following example is illustrative of these properties.

EXAMPLE XII

Condensation of 0.0250 mole of N,N'-bis[(dimethylamino) dimethylsilyl] tetramethylcyclodisilazane and 0.0250 mole of bis(p-hydroxydimethylsilylphenyl) ether in 100 ml. of toluene according to the procedure of Example V with 22.5 ml. of the 0.010 g./ml. solution of bis(trimethylsilyl)acetamide being utilized resulted in a 95% yield of a polymer with an inherent viscosity of 0.26 dl./g.

The product polymer was heated in a thermogravimetric analyzer in an atmosphere of dry air at a rate of 3°/minute. The polymer showed no decomposition up to 475° C. At 570° C. a weight loss of only 10% was observed. At 900° C. 42% of the pyrolyzed residue remained.

To determine the hydrolytic stability of the above polymer a coating of the same was cast on a thallium bromide-thallium iodide optic and exposed to water-saturated air for 100 hours at room temperature. At selected intervals the polymer-coated optic was removed from the humidity chamber and used to determine the infrared spectrum of the polymer film. The degree of hydrolysis of the cyclodisilazane structure was determined by comparing the initial intensity of the $SiCH_3$ infrared band at 1255 cm.$^{-1}$ to the cyclodisilazane infrared band at 1035 cm.$^{-1}$ at any selected time. When thick films were used, no change in the relative intensities of the IR bands could be observed over the exposure period. When a thinner polymer film was used and the initial ratio was 1.41 to 1, the ratio decreased to 1.29 to 1 in 10 hours but remained unchanged for an additional 40 hours. After 55 hours the ratio decreased to 1.16 to 1 but did not change further through the remaining 45 hours of the test. These results are to be contrasted with other known silicon-nitrogen-containing polymers which show complete decomposition in a relatively short period of time under the same conditions.

In addition to being elastomeric in nature, the polymers of the present invention can be compounded into materials with rubber-like characteristics. This is accomplished by using known organic peroxide catalysts including bis-($\alpha,\alpha$-dimethylbenzoyl) peroxide, benzoyl peroxide and bis(dichlorobenzoyl) peroxide. It is also preferable to include a filler such as ferric oxide or silica to increase the strength of the cured rubber. The polymer is preferably cured into a rubber by heating it in the presence of the catalyst at a temperature within the range of 90° C. to 170° C. It can then be post-cured for longer periods of time to further enhance its strength. The cured product polymer has been found to have highly desirable rubber-like characteristics as indicated by the following example:

EXAMPLE XIII

A polymer based upon the condensation of 0.0300 mole of N,N' - bis[(dimethylamino)dimethylsilyl]tetramethylcyclodisilazane and 0.0289 mole of bis(p-dimethylhydroxysilylphenyl) ether was found to have an inherent viscosity of 0.26 dl./g. The product polymer was cured in each of the following ways:

Formulation A.—Two grams of polymer, containing 0.06 gram of peroxide catalyst were press-cured at 500 p.s.i. and 160° C. for 40 minutes. The polymer was then cooled under pressure followed by a post-cure of 1 hour at 38° C., 1 hour at 66° C., and overnight at 149° C.

Formulation B.—Ten grams of a polymer containing 0.06 gram of a 50% solution of benzoyl peroxide in silicone oil were press-cured at 500 p.s.i. and 127° C. for 40 minutes. The polymer was then cooled under pressure followed by a post-cure of 1 hour at 66° C., 1 hour at 93° C., and overnight at 121° C.

Formulation C.—Two grams of polymer containing 0.06 gram of ferric oxide and 0.80 gram of silica as a filler and 0.06 gram of peroxide catalyst were cured at 10,000 p.s.i. and 160° C. The polymer was cooled under pressure and post-cured for 1 hour at 93° C., 1 hour at 121° C., 1 hour at 149° C., and overnight at 177° C.

The following values for hardness, elongation and tensile strength of the above formulations were observed:

| Formulation | Hardness, shore A pts. | Elongation, percent | Tensile strength, p.s.i. |
|---|---|---|---|
| A | 46 | 300 | 42.1 |
| B | 41 | 400 | 58.9 |
| C | 66 | 180 | 287.3 |

Having thus described the invention, what is claimed as new and desired to be secured by Letters Patent is:

1. A method for producing a polymer containing an elemental repeating unit of the formula:

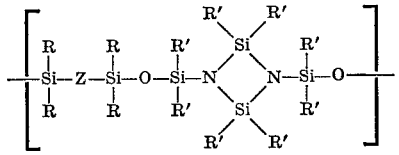

comprising the steps of reacting a disilanol of the formula:

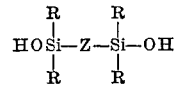

with a cyclodisilazane of the formula:

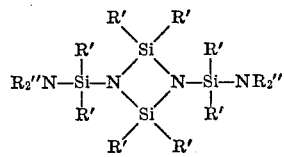

wherein each instance R, R' and R'' each represents a member selected from the group consisting of $C_1$ to $C_3$ alkyl radicals and aromatic radicals having six carbon atoms in the aromatic ring and Z represents an arylene group, said reacting step being conducted with said disilanol and said cyclodisilazane in solution in an organic solvent at a temperature in the range of 20 to 200° C., and reacting any residual disilanol with a silylating agent selected from the group consisting of bis(trimethylsilyl)acetamide and hexamethyldisilazane.

2. A method as set forth in claim 1, wherein said reacting step includes reacting stoichiometric quantities of said disilanol and said cyclodisilazane.

3. A method as set forth in claim 2, wherein is included the step of adding an organic peroxide catalyst to said polymer to promote cross-linking of the latter and continuing said cross-linking until said polymer is characterized by rubber-like properties.

4. A method as set forth in claim 1, wherein is included, prior to said reacting step, the steps of dissolving said disilanol in an organic solvent therefore at a concentration of not greater than 2.5 millimoles per milliliter, dissolving said cyclodisilazane in an organic solvent therefor at a concentration of not greater than 2.5 millimoles per milliliter, and combining the resulting solutions.

5. A method as set forth in claim 4, wherein said reacting step includes heating the combined solution of disilanol and cyclodisilazane at a temperature in the range of 20 to 200° C.

6. A method as set forth in claim 5, wherein the step of reacting said disilanol with said cyclodisilazane results in the production of a secondary amine of the formula $R''_2NH$ and including the step of continuing said heating step until substantially all of said secondary amine is volatilized from said combined solutions.

7. A method as set forth in claim 5, wherein said heating step includes raising the temperature of the solutions to not more than 150° C.

8. A method as set forth in claim 4, wherein is included, subsequent to adding said silylating agent, the step of heating said combined solutions to further enhance the degree of polymerization of said polymer.

9. A method as set forth in claim 8, wherein the step of adding a silylating agent includes adding a quantity of bis(trimethylsilyl)acetamide to the combined solutions.

10. A method as set forth in claim 8, wherein is included the additional steps of removing the solvent from the combined solutions to separate said polymer therefrom and heating said polymer to further enhance the degree of polymerization thereof.

11. A method as set forth in claim 1, wherein the step of reacting a disilanol with a cyclodisilazane includes reacting bis(p-hydroxydimethylsilylphenyl) ether with N,N' - bis[(dimethylamino)dimethylsilyl]tetramethylcyclodisilazane.

12. A method as set forth in claim 1, wherein the step of reacting a disilanol with a cyclodisilazane includes reacting p-phenylenebis(dimethylsilano) with N,N'-bis[(diethylamino)dimethylsilyl]tetramethylcyclodisilazane.

13. A method as set forth in claim 1, wherein the step of reacting a disilanol with a cyclodisilazane includes reacting bis(p-hydroxydimethylsilylphenyl) ether with N,N'-bis[(dimethylamino)methylphenylsilyl] - 2,4 - dimethyl-2,4-diphenylcyclodisilazane.

14. A method of producing a polymer containing an elemental repeating unit of the formula

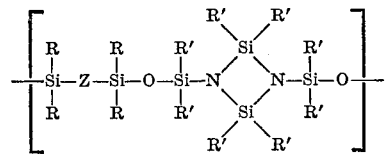

comprising the steps of:
forming in an organic solvent a first solution of a disilanol of the formula

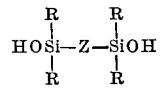

at a concentration of not greater than 2.5 millimoles per milliliter;
forming in an organic solvent a second solution of a cyclodisilazane of the formula

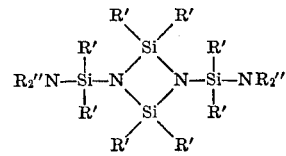

at a concentration of not greater than 2.5 millimoles per milliliter, where in each instance R, R' and R" each represents a member selected from the group consisting of $C_1$ to $C_3$ alkyl radicals and $C_6$ aromatic radicals having six carbon atoms in the aromatic ring, and Z represents an arylene group;

combining said first and second solutions;

heating said combined solutions to not more than 150° C. to cause said disilanol to react with said cyclodisilazane to form said polymer and a secondary amine of the formula $R''_2NH$;

continuing said heating until substantially all of said secondary amine is volatilized from said combined solutions;

discontinuing said heating;

adding a solution of bis(trimethylsilyl)acetamide in an organic solvent to said combined solutions for reaction with any residual silanol groups on said disilanol;

removing the solvent from the combined solutions; and heating said polymer to not more than 150° C. to further the degree of polymerization thereof.

15. A method as set forth in claim 14, wherein is included the steps of removing the solvent from the combined solutions and heating the polymer prior to said step of adding a solution of bis(trimethylsilyl)acetamide.

16. A method as set forth in claim 14, wherein is included the additional step of adding an organic peroxide catalyst to said polymer and heating the polymer to a temperature within the range of 90° to 170° C. for a sufficient period of time to effect cross-linking of said polymer.

17. A method as set forth in claim 16, wherein is included the step of adding a filler to said polymer prior to said cross-linking thereof.

References Cited
UNITED STATES PATENTS

| | | | |
|---|---|---|---|
| 3,422,060 | 1/1969 | Fink | 260—46.5 |
| 3,575,922 | 4/1971 | Fink | 260—46.5 |

DONALD E. CZAJA, Primary Examiner

M. I. MARQUIS, Assistant Examiner

U.S. Cl. X.R.

260—2 S, 37 SB, 46.5 E, 46.5 G, 47 R, 448.2 N